Nov. 2, 1926.
H. F. BRELSFORD
AIMING DEVICE FOR CAMERAS
Filed Nov. 2, 1925
1,605,389
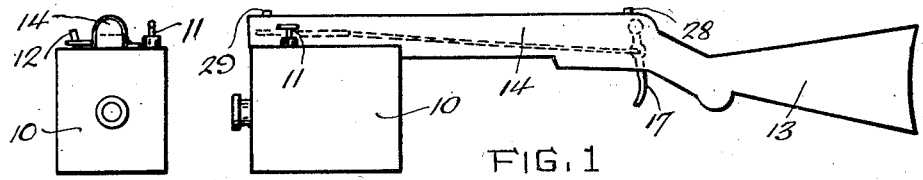
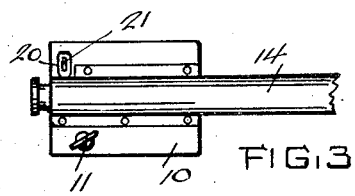
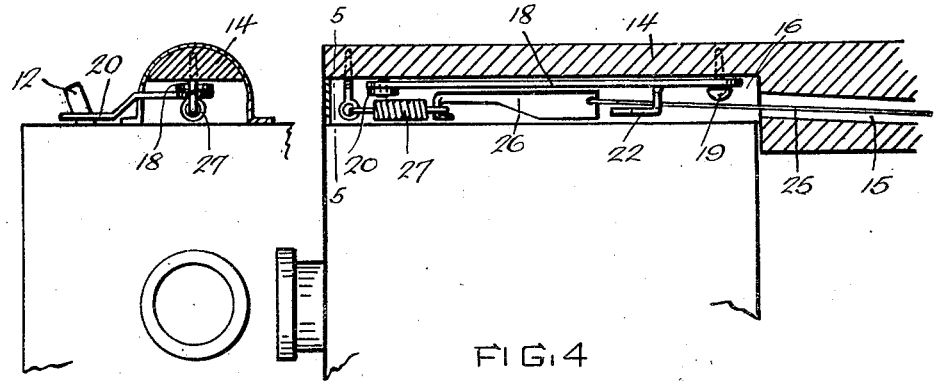
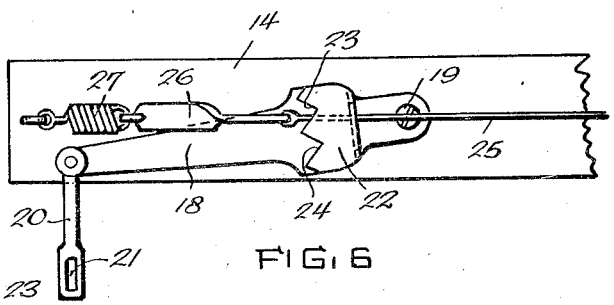
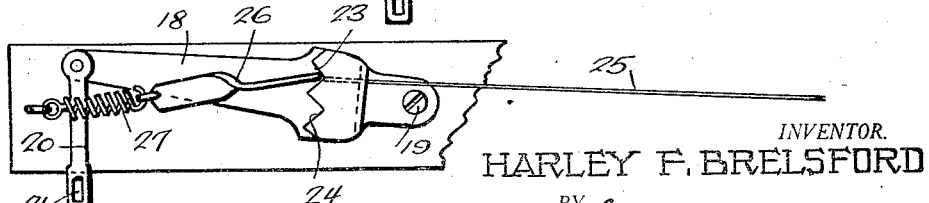
INVENTOR.
HARLEY F. BRELSFORD
BY
Shigley & Harney
ATTORNEYS Patented Nov. 2, 1926.

1,605,389

UNITED STATES PATENT OFFICE.

HARLEY F. BRELSFORD, OF SIDNEY, OHIO.

AIMING DEVICE FOR CAMERAS.

Application filed November 2, 1925. Serial No. 66,240.

My present invention relates generally to cameras and more particularly to attachments therefor whereby the subject to be photographed may be easily and conveniently "found" or in other words brought within the range of the lens, and my primary object is the provisions of a gun-like holder by which the camera may be readily and easily aimed, as well as the provision of such a holder having a trigger-like finger lever and connections whereby the shutter actuating lever of the camera may be conveniently manipulated from the finger lever similar to the manner in which it is usually accomplished directly by finger pressure.

It is well known that most cameras have a swinging shutter actuating lever, each movement of which in one direction, both opens and then closes the camera shutter when the parts are set for instantaneous exposures, and which merely opens the shutter, requiring a second swinging movement to close the shutter, when the parts are set for a time exposure. Naturally, therefore, my invention aims to provide a mechanism operable with either setting, as well as one which is both simple and inexpensive, easy to use, and will be effective and efficient.

In the accompanying drawing which illustrates my invention and forms a part of this specification—

Figure 1 is a side elevation with the camera attached;

Figure 2 is a front elevation;

Figure 3 is a partial top plan view;

Figure 4 is an enlarged vertical longitudinal section through the forward portion of the holder;

Figure 5 is a vertical transverse section taken on line 5—5 of Figure 4;

Figure 6 is a bottom plan view of the trigger actuated parts, showing the same in one position; and Figure 7 is a similar view showing the parts in the other position.

Referring now to these figures, I have shown in Figures 1, 2 and 3 a camera 10 of the box type having an upper film shifter 11 and a laterally swinging shutter-actuating lever 12, although it is to be understood that I reserve the right to employ any camera capable of use with my invention.

My improved holder includes a shoulder engaging portion or stock 13 and an elongated supporting arm 14 somewhat similar to a gun barrel, said arm 14 having a lengthwise bore 15 leading rearwardly therethrough from its lower forward recess 16 to a point adjacent to a trigger 17 which is pivotally mounted in the holder about where the camera-supporting arm 14 joins the stock 13.

The recess 16 is formed in the lower portion of the free end of the supporting arm where the latter is attachable to the camera 10, and this attachment may be by means of screws or like fastening members or by straps or other clamping binders. Within the recess a lever 18 is pivoted at one end as at 19 to swing in a lateral plane, the free end of this lever having a pivotal, laterally projecting link 20 having a lengthwise slot 21 adjacent to its free end to receive the shutter-actuating lever 12. The lever 18 is moreover provided intermediate its ends with an angular bracket 22 whose forwardly projecting lower edge is notched as at 23 and 24 at opposite sides of the longitudinal axis of the lever 18.

Extending forwardly through the bore of the supporting arm of the holder is a flexible connection 25 whose rear end is attached to the trigger and whose forward end is attached to a forwardly and rearwardly moving shifter 26 within the recess 16 forwardly of the bracket 22. This shifter is normally held in its forward position by a spring 27 attached to its forward end and as this spring constitutes the sole means of anchoring the shifter in the recess 16, the shifter is free to yield laterally during its rearward movement against the tension of spring 27 for a purpose which will presently appear.

In operation the camera 10 is so adjusted when connected to the supporting arm of the holder as to readily bring objects within the range of its lens by sighting along the holder with the stock against the shoulder in the same manner as a gun is sighted, and for this purpose sights 28 and 29 may be employed on the supporting arm 14.

With the objective sighted in the manner above outlined, the operator pulls the trigger 17 rearwardly and, through the flexible connection 25, similar movement is imparted to the shifter 26. The lever 18 is always positioned at an angle to one side or the other of the center line through its pivot, and thus when the shifter is drawn rearwardly it moves into one or the other of the notches 23 and 24 of the bracket 22 and the lever is shifted into its other angular position. Obviously during this movement the shutter-actuating lever 12 moves from one limit to the other of its stroke and when pressure against the trigger is released, the shifter is pulled forwardly by its spring 27 and is thus ready for the next stroke. The shifter 26 being movably supported by spring 27 is free to yield laterally with the swinging movements of lever 18 which it thus swings in alternately opposite directions.

I claim:—

1. In an aiming device for a camera, the combination with an oscillatable lever, of a flexible trigger mechanism including a shifter, a resilient support for the shifter, and co-acting means on the shifter and lever for oscillating the lever in alternate directions.

2. In an aiming device for a camera, the combination with a pivoted oscillatable lever having a transversely disposed notched and slotted bracket, of a trigger cord passed through the slotted bracket, a shifter disposed longitudinally of the lever for co-action with the notched bracket and connected at one end to said cord, and a spring for anchoring the other end of the shifter.

3. The combination with an oscillatable lever having a bracket thereon and notches in said bracket at the sides of the longitudinal center of the lever, of a shutter actuating lever and a link connecting said levers, a trigger mechanism, a shifter disposed longitudinally of the oscillatable lever and connected with said trigger mechanism, and a spring for supporting said shifter.

In testimony whereof I have affixed my signature.

HARLEY F. BRELSFORD.